United States Patent Office 3,429,447
Patented Feb. 25, 1969

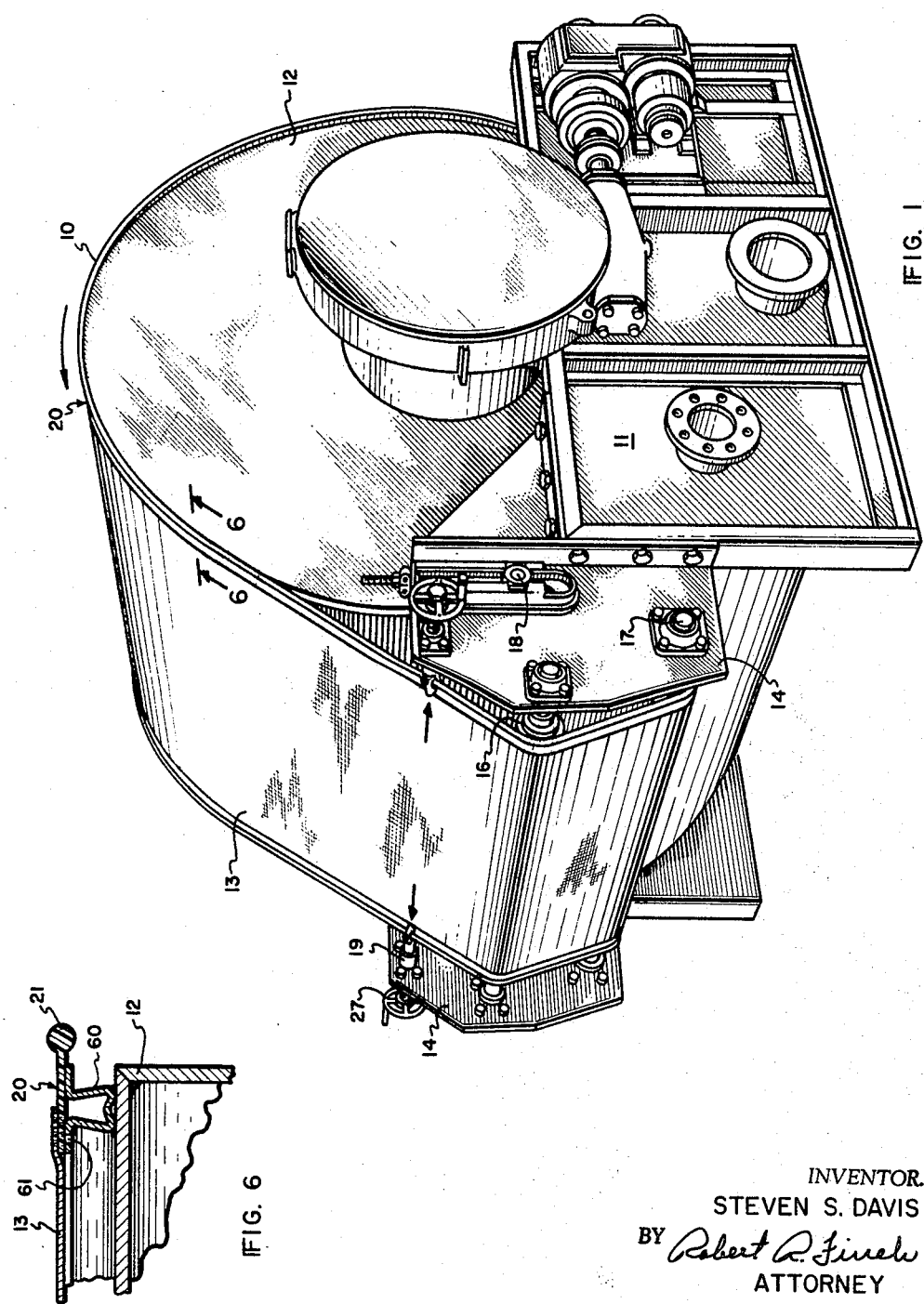

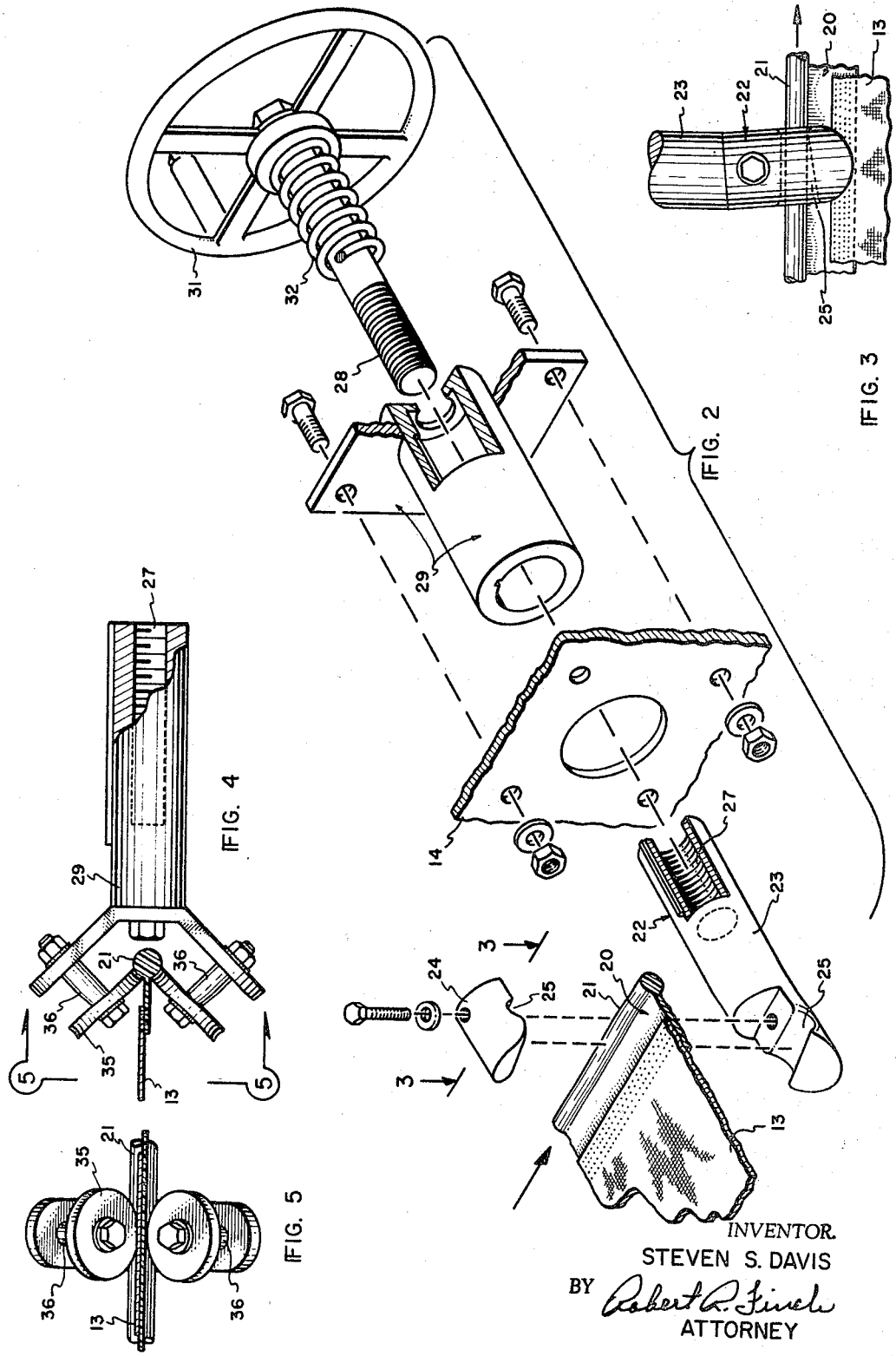

3,429,447
ALIGNING MEANS FOR ENDLESS WEB FILTER
Steven S. Davis, 550 South 1st East,
Bountiful, Utah 84010
Continuation of application Ser. No. 621,998, Mar. 9, 1967, which is a continuation of application Ser. No. 315,658, Oct. 11, 1963. This application Aug. 7, 1967, Ser. No. 658,947
U.S. Cl. 210—401    7 Claims
Int. Cl. B01d 33/04

ABSTRACT OF THE DISCLOSURE

An apparatus for maintaining a filter web in alignment with a filter drum in which an outward aligning force is exerted on the beaded edge of the filter web at a span at which the filter web is out of engagement with the filter drum and guide rolls by a distance necessary to insure that neither the filter web nor guide rolls offer undue resistance to the aligning of the filter web and in which provision is made for release of the filter web in the event that the aligning force reaches a level which threatens damage to the filter web.

---

This application is a continuation of an application Ser. No. 621,998 filed Mar. 9, 1967 (now abandoned), which in turn was a continuation of a prior application Ser. No. 315,658 filed Oct. 11, 1963 (now abandoned).

This invention relates generally to vacuum filters of the type employing an endles web filter medium trained successively about the filter section and a web support section spaced therefrom. More particularly, the invention relates to improved means for maintaining the web in porper alignment with respect to its path of travel about the filter and support.

It is a primary object of the invention to provide means to maintain such a traveling web properly aligned and to correct deviation from proper alignment by the application of forces solely to the edges of the web.

It is a further object of the invention to provide alignment apparatus which is low in initial cost and operating expense yet requires only minimum operator attention.

Another object is the provision of simple aligning apparatus that continuously spreads the web to maintain it wrinkle-free across its width.

An important related object is the provision of a particular web construction adapted for use in combination with the aligning apparatus of the invention.

The invention is based on the concept that the application of force solely to the edges of the web at a location where the web is otherwise free from contact with any supporting surfaces, enables the web to be maintained in proper alignment, or corrective alignment effected, with the application of very light directly applied forces.

In order that the invention may be more readily understood and carried into effect, reference is made to the accompanying drawings which are offered by way of example only and not in limitation of the invention, the scope of which is defined by the appended claims rather than by any preceding description.

In the drawings:

FIG. 1 is a perspective view of an endless web drum filter embodying the invention.

FIG. 2 is an enlarged exploded view of the aligning device employed in the embodiment illustrated in FIG. 1.

FIG. 3 is a partial elevational view taken as looking in the direction of arrows 3—3 of FIG. 2, the parts being assembled for purposes of clarity.

FIG. 4 is a side elevation view of a modified form of the invention.

FIG. 5 is a view taken as looking in the direction of arrows 5 of FIG. 4.

FIG. 6 is a sectional view taken in the plane of line 6—6 of FIG. 1 illustrating a particular web construction useful with the invention.

Figure 7:
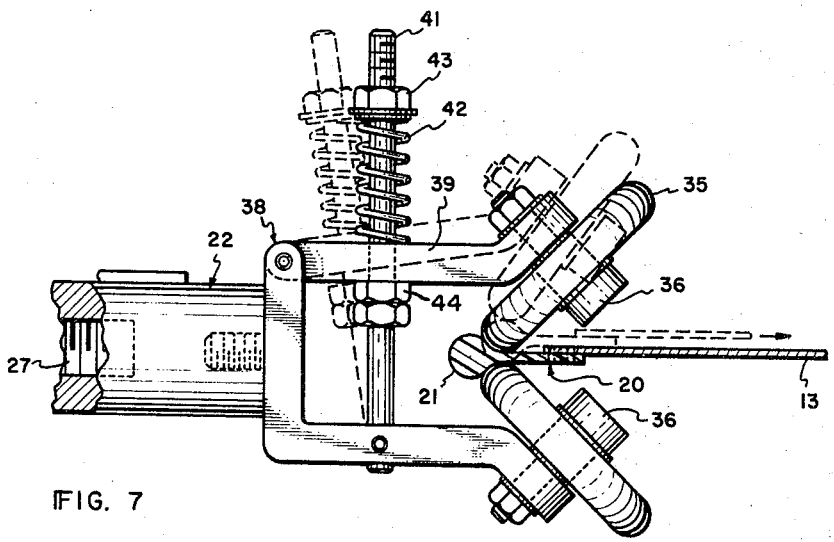
FIG. 7 is a view of a modification of the edge guide means of the invention similar to that in FIGS. 4 and 5 but additionaly having an overload release arrangement, dotted lines being employed to illustrate movement of elements during operation.

As illustrated in FIG. 1, the invention is embodied in a filter, generally designated 10, which includes a filter tank 11 with a rotary drum filter section 12 mounted for rotation therein. As is usual with endless web filters, there is provided a suitable filter medium 13 in the form of an endless belt trained to pass successively over the drum 12 and a web supporting roll 16 which is spaced from the drum and journalled for rotation between end plates 14 of the filter. Additional rolls, such as 17 and 18, may be employed as necessary to effect cake discharge, web washing and return of the web to the drum.

In order to maintain the web properly aligned in its path of travel on the filter and spaced apart web support sections there are provided edge engaging devices 19 on each of the opposite sides of the filter. As hereinafter described in greater detail, these devices are designed to engage the web by its edge strip 20 and specifically by the associated outer bead 21.

The web engaging devices are mounted on opposite sides of the filter at a location intermediate the drum and the web supporting rolls 16–18. Although the devices may be located between rolls such as between roll 16 and 17 instead of between the drum and the rolls, it is important that they always be so located as to engage the web at a position where its surface is not in contact with either a roll or a drum.

In other words, the aligning forces are applied only to unsupported portions of the web. This is important because by avoiding the frictional influence of either the supporting rolls or the drum there is enabled alignment by the application of only light forces of a far different magnitude than would be required to effect corrective shifting of the web while it is frictionally engaged with either the drum or any of the web engaging rolls 16–18.

In the embodiment shown in FIGS. 1 and 2, the web engaging means comprises a guide block 22 formed from complemental blocks 23 and 24 adapted to be held together by any suitable fastener. The blocks 23 and 24 are each provided with a groove 25 which, upon assembly, form a retaining channel through which the beaded edge 21 of the web may be guided. In this connection, the blocks are so formed that when assembled there is provided a slot between the channel and the inner end face of the block. This slot is smaller than the bead but large enough to accommodate passage of the flat portion of the edge strip or the web itself while the bead passes through and is laterally retained in the groove.

The block 22 is provided with a threaded bore 27 to receive a threaded shaft 28, the other end of which passes through a plate and sleeve assembly 29 adapted to be secured to the side plate 14. On the outer end of the shaft 28 is mounted a hand wheel 31; and a spring 32 is positioned concentrically about the shaft between the wheel and plate. There is thus provided a construction in which the guide blocks 22 are normally resiliently urged outwardly away from each other and from the web edges. When the guide blocks are assembled as in FIGS. 1 and 3 and in place on the filter with the web passing therethrough, the springs 32 hold the web stretched smoothly across its entire width. At the same time, lateral deviations of the web are automatically corrected by the resulting unbalance of the springs which tend always to return to a balanced condition with equal tension on each side.

In connection with construction of the guide blocks, it will be noted that the grooves 25 are of particular configuration having a flared entrance end to facilitate acceptance of the bead as it travels thereinto.

In order to further reduce friction on the web edge 21, as may be necessary in cases where relatively high tension is required to keep the web taut, a modified construction of the web engaging means is provided. This construction, illustrated in FIGS. 4 and 5, employs wheels or rollers 35 between which the web edges are guided. In accordance with this modification of the invention the wheels are journalled on axle-shafts 36 mounted with converging axes so that the web bead 21 has the outward force more directly applied against it as it rolls between the wheels with the outward pressures exerted at a substantial angle to the axis of each wheel rather than parallel thereto as would be the case if the axles were parallel to each other.

A special modification of the invention is illustrated in FIG. 7 which depicts a construction similar to that shown in FIGS. 4 and 5; but is additionally provided with means for resiliently yet yieldably urging the wheels outwardly on the bead. The advantage of this is evident when it will be realized that in a mounting such as illustrated in FIGS. 1 and 2, in which the web is non-yieldably retained in a resiliently mounted edge engaging assembly, there is a limit beyond which the resilient springs (32 of FIG. 2) cannot go. This would occur in the case of some extreme unbalance or biasing of the filter web; and if the resilient limit is exceeded the web may be damaged. To guard against this, the construction shown in FIG. 7 may be utilized.

In such a construction, the end pieces 23 and 24 of the block of FIG. 2 are replaced with a bracket 38 from which are extended the axles 36 of the wheels 35. In the illustrated embodiment, the bracket 38 has one side portion 39 hinged to a rigid bracket piece so as to enable the two wheels 35 to be swung toward and away from the bead and from each other. The wheels are held adjacent each other and against the bead by means of a shaft 41, which extends from the rigid bracket piece through the hinged bracket piece, and a spring 42 concentrically positioned about the shaft to be compressed against the hinged bracket arm and held in place with a suitable stop nut 43. Thus, the hinged piece 39 and its associated axle 36 is normally urged toward the other wheel and outwardly against the bead. A stop 44 on the shaft 41 limits the downward movement of the hinged piece 39 under the force exerted by the spring 42.

The spring 42 may be adjusted to yield at any desired tension to release the web 13. Thus, the wheels 35 are resiliently but yieldably mounted by means normally urging them together and are set to yield and release the web before it tears.

In connection with FIGS. 4, 5 and 7, similar elements are denoted by the same reference numerals for convenience.

Figure 8:
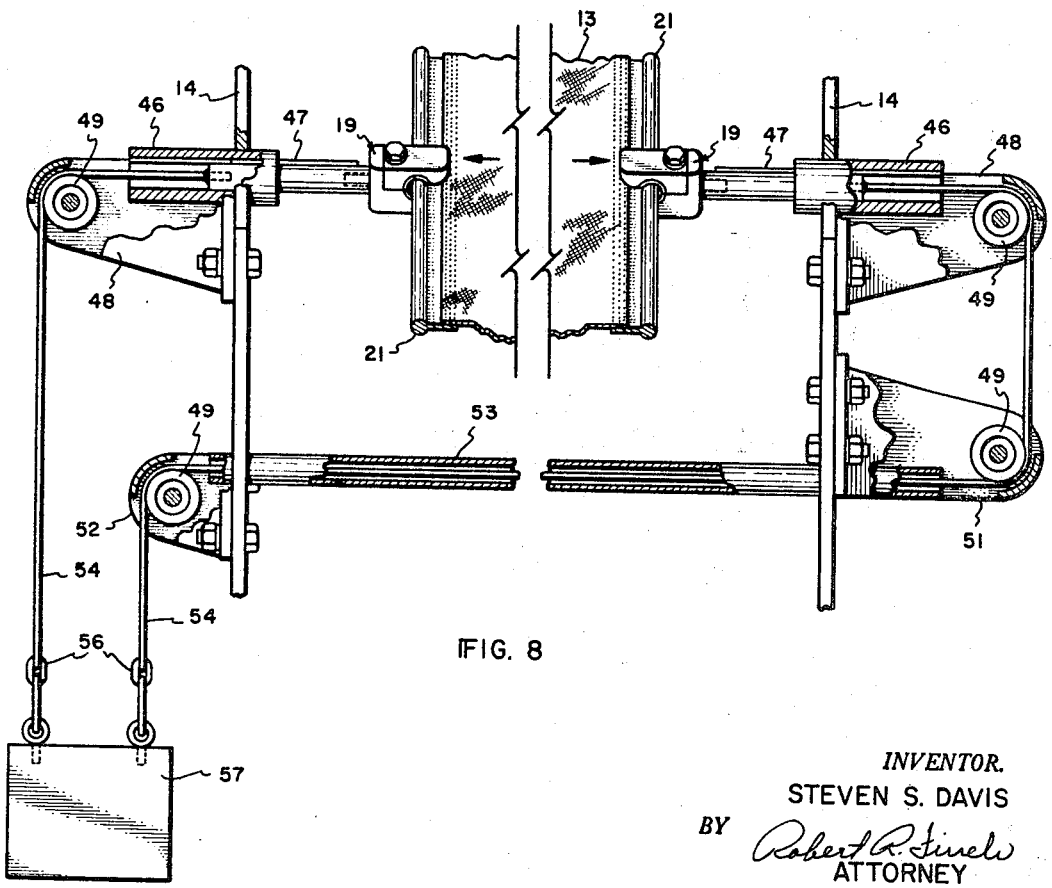
FIG. 8 is a partial view of a filter, partly in section, illustrating more or less diagrammatically, a particular arrangement for automatically applying the necessary force to effect alignment or correction thereof in accordance with the invention.

FIG. 8 shows a particular embodiment of the invention providing an economical structure for applying equal tension on opposite sides of the web over a wider range of unbalance than the spring arrangement of FIG. 2.

In such arrangement (FIG. 8), the web 13 with its beaded edge 21 is, as previously described in connection with FIGS. 1–7, arranged to be engaged by guide means as it passes from the drum to the rolls. One of the web engaging guide blocks, 19, is mounted adjacent each of the side plates and in engagement with an edge of the web. Instead of the resilient spring mounting for the guide blocks there is utilized a gravity weight system. Such system comprises a sleeve 46 passing through each of the side plates and slideably receiving the shafts 47 to which the guides 19 are attached. Suitable brackets 48 extend outwardly from each of the side plates adjacent the sleeves and each bracket is provided with a pulley or sheave 49. Located below the brackets is another pair of brackets respectively numbered 51 and 52, each of which has a sheave 49 as on the upper brackets 48. A tube 53 extends between the side plates adjacent the lower brackets to provide a covered cable passage near the web.

Attached to each shaft 47 is a cable or other flexible draft means 54. The cables extend over their respective pulleys to terminate in a connection 56 to the single weight 57.

When the web is properly centered, each guide carries one-half of weight 57. Any unbalancing of forces, as will occur if the web shifts laterally, will immediately result in a reduction in weight carried by one guide and a corresponding increase in weight carried by the other guide. In other words, as one cable moves in a direction to increase tension on the weight the other moves oppositely to decrease tension on the weight, thus throwing more of the weight on to one of the guides to apply a corrective force on the web which continues until the web is re-centered and the weight equally distributed between both cables.

Rapidity of response in shifting of the web may be varied by moving the cable connections closer together for more rapid response or further apart for more gradual response. It will be noted also that this arrangement has a far greater operating range than does the arrangement of FIGS. 1 and 2 utilizing springs as the resilient mounting means for the web engaging devices. This is so, because the total weight 57 is the maximum force to be applied to the web and continued unbalancing merely shifts the weight further rather than putting increasing tension on the web as would occur in the spring mounting system of FIGS. 1 and 2.

In accordance with the invention, additional advantages in filtration are obtained by utilizing a particular web construction in which the edge pieces have a flat fluid-impervious portion of sufficient width to overlap onto the effective filtering area of the drum. In the construction illustrated in FIG. 6, the flat portion 20 extends over onto a division strip 60 of the filter; and the inner wing of the strip is drilled, as it 61, so that vacuum may act to pull the flat strip into sealing engagement with the edge of the drum. In other words, by providing the porous filter medium of a width less than the effective filter area of the drum and then providing the flat impervious strips on each side of width such that the total width of the web and edges is greater than the effective filter area there is provided a filter web adapted to be firmly sealed against the drum. At the same time, there is provided additional structural strength enabling the application of alignment forces to the web.

In connection with the web construction, the edge pieces should be of low friction sturdy material and may be sewn or heat sealed to the porous web portion.

I claim:

1. In a filter of the type having a filter drum, an endless filter web having continuous beads along opposite edges thereof, and guide roll means engaging the filter web in guiding the filter web from engagement with the filter drum for cleaning and removal of filter cake and then returning it into engagement with the filter drum, the improvement of apparatus for maintaining the filter web aligned with the filter drum comprising a pair of rollers, the rollers being on opposite sides of the plane of the filter web and adjacent one of the beads at a span of the filter web at which the filter web is out of engagement with and spaced substantial distances from the filter drum and the guide roll means to insure that neither will offer undue resistance to the aligning of the filter web by the said aligning apparatus, the rollers being engageable with the bead to apply an aligning force on the filter web, a support for each of the rollers, means for exerting through the rollers an aligning force outwardly of the bead on the said span of the filter web in the event that the filter web tends to move out of alignment with the filter drum in a direction opposite the direction of the aligning force, means for mounting at least one of the roller supports for movement relative to the other to permit separation of the rollers and release of the beaded edge from between the rollers and prevent damage to the web in the event that excessive force is required to maintain the filter web in alignment with the filter drum, and resilient means acting on the movable roller support with a predetermined force to resist the separation of the rollers and the release of the beaded edge under normal operating conditions.

2. Filter web aligning apparatus as set forth in claim 1 including a stop engageable with and limiting the movement of the movable roller support under the force exerted by the resilient means acting on the movable roller support.

3. Filter web aligning apparatus as set forth in claim 1 in which each of the rollers is formed with a relatively narrow circumferential edge adapted to engage a bead of the filter web in rolling contact, and wherein the rollers are supported by their respective roller supports with their axes of rotation intersecting the plane of the filter web so that the circumferential edges are disposed to exert forces having components parallel to the plane of the web in a direction outwardly of said bead.

4. Filter web aligning apparatus as set forth in claim 1 including a pair of rollers engageable with the bead on the opposite edge of the same span of the filter web, and means for supporting them to apply an aligning force on the filter web in a direction opposite the aligning force which the first-mentioned rollers are capable of applying.

5. In a filter of the type having a filter drum, an endless filter web having continuous beads along opposite edges thereof, and guide roll means engaging the filter web in guiding the filter web from engagement with the filter drum for cleaning and removal of filter cake and then returning it into engagement with the filter drum, the improvement of apparatus for maintaining the filter web aligned with the filter drum comprising at least one pair of rollers, the rollers being on opposite sides of the plane of the filter web and adjacent one of the beads at a span of the filter web at which the filter web is out of engagement with and spaced substantial distances from the filter drum and the guide roll means to insure that neither will offer undue resistance to the aligning of the filter web by the said aligning apparatus, the rollers being engageable with the bead to apply an aligning force on the filter web, a member supported adjacent an edge of the filter web and guided for movement toward and away from said edge, means urging the member outwardly away from the respective edge of the filter web, a pair of arms carried by said movable member and extending toward the respective edge of the filter web but on opposite sides thereof for the support of said rollers, means pivotally supporting one arm for movement relative to the other to permit separation of the rollers and release of the beaded edge from between the rollers and to prevent damage to the web in the event that excessive force is required to maintain the filter web in alignment with the filter drum, and resilient means acting on the pivotal supporting arm with a predetermined force to resist the separation of the rollers and the release of the beaded edge under normal operating conditions.

6. Filter web aligning apparatus as set forth in claim 5 in which the resilient means is a spring, and including a spring supporting member connected to one of the arms, a spring retaining means carried by said spring supporting member for holding the spring in position to exert a force between the arms which resists the separation of the rollers, means for adjusting the force exerted by said spring, and stop means for limiting the movement of the pivotal arm toward the other arm.

7. In a filter of the type having a filter drum, an endless filter web having continuous beads along opposite edges thereof, and roll means engaging the filter web in guiding the filter web from engagement with the filter drum for cleaning and removal of filter cake and then returning it into engagement with the filter drum, the improvement of apparatus for maintaining the filter web aligned with the filter drum comprising a pair of rollers adjacent opposite edges of the filter web at a span at which the filter web is out of engagement with and spaced substantial distances from the filter drum and the guide roll means to insure that neither will offer undue resistance to the alignment of the filter web, the rollers of each pair being on opposite sides of the plane of the filter web and adjacent one of the beads, a support for each of the rollers, means urging one pair of rollers away from the other pair to exert an aligning force outwardly of the bead on the said span of the filter web in the event that the filter web tends to move out of alignment with the filter drum in a direction opposite the direction of the aligning force, means for mounting at least one of the roller supports of each pair for movement relative to the other to permit separation of the rollers and release of the beaded edge from between the rollers and prevent damage to the web in the event that excessive force is required to maintain the filter web in alignment with the filter drum, and resilient means acting on the movable roller support of each pair with a predetermined force to resist the separation of the rollers and the release of the beaded edge under normal operating conditions.

References Cited

UNITED STATES PATENTS

| | | | |
|---|---|---|---|
| 2,071,682 | 2/1937 | Buccicone | 26—65 X |
| 2,728,941 | 1/1956 | Alles et al. | 210—401 X |
| 3,077,990 | 2/1963 | Peterson | 210—401 |

SAMIH N. ZAHARNA, *Primary Examiner.*